US011081903B2

(12) United States Patent
Colombi et al.

(10) Patent No.: US 11,081,903 B2
(45) Date of Patent: Aug. 3, 2021

(54) PROTECTION METHODS AND SWITCHES IN UNINTERRUPTIBLE POWER SUPPLY SYSTEMS

(71) Applicant: ABB Schweiz AG, Baden (CH)

(72) Inventors: Silvio Colombi, Losone (CH); Andrea Mannuccini, Locarno (CH); Harry Bye Handlin, Birmingham, AL (US); Lorenzo Giuntini, Locarno (CH)

(73) Assignee: ABB Schweiz AG, Baden (CH)

( * ) Notice: Subject to any disclaimer, the term of this patent is extended or adjusted under 35 U.S.C. 154(b) by 76 days.

(21) Appl. No.: 16/405,203

(22) Filed: May 7, 2019

(65) Prior Publication Data

US 2019/0260227 A1  Aug. 22, 2019

Related U.S. Application Data

(62) Division of application No. 14/823,233, filed on Aug. 11, 2015, now Pat. No. 10,284,007.

(60) Provisional application No. 62/067,705, filed on Oct. 23, 2014, provisional application No. 62/161,393, filed on May 14, 2015.

(51) Int. Cl.
  *H02J 9/06* (2006.01)
  *H02M 1/34* (2007.01)
  *H02J 3/38* (2006.01)

(52) U.S. Cl.
  CPC ............. *H02J 9/061* (2013.01); *H02J 9/062* (2013.01); *H02M 1/34* (2013.01); *H02J 3/38* (2013.01)

(58) Field of Classification Search
  CPC ............. H02J 9/061; H02J 9/062; H02M 1/34

USPC .......................................................... 307/65
See application file for complete search history.

(56) References Cited

U.S. PATENT DOCUMENTS

| 4,782,241 | A | 11/1988 | Baker et al. |
| 6,133,651 | A * | 10/2000 | Kono ............. H02J 9/062 307/64 |
| 6,191,500 | B1 | 2/2001 | Toy et al. |
| 7,459,803 | B2 | 12/2008 | Mosman |
| 7,566,988 | B2 | 7/2009 | Heber et al. |
| 7,668,624 | B2 | 2/2010 | Heber et al. |
| 9,806,560 | B2 | 10/2017 | Navarro |
| 10,284,007 | B2 | 5/2019 | Colombi et al. |

(Continued)

FOREIGN PATENT DOCUMENTS

| CN | 2812380 Y | 8/2006 |
| CN | 101330224 A | 12/2008 |

(Continued)

OTHER PUBLICATIONS

EP Search Report and Written Opinion from corresponding EP Application No. 15190507.2 dated Apr. 5, 2016.

(Continued)

*Primary Examiner* — Rexford N Barnie
*Assistant Examiner* — Brian K Baxter
(74) *Attorney, Agent, or Firm* — Barnes & Thornburg LLP

(57) ABSTRACT

In at least one embodiment, a system may include a plurality of uninterruptible power supplies (UPSs), a ring bus, a plurality of chokes, with each choke of the plurality of chokes electrically coupling an associated UPS of the plurality of UPSs to the ring bus, and at least one switch (Continued)

electrically coupled between at least one UPS of the plurality of UPSs and the ring bus, with the at least one switch having an opening time of less than 10 milliseconds.

13 Claims, 8 Drawing Sheets

(56) References Cited

U.S. PATENT DOCUMENTS

| | | | |
|---|---|---|---|
| 2002/0011752 | A1 | 1/2002 | Powell |
| 2005/0036248 | A1 | 2/2005 | Klikic et al. |
| 2005/0200205 | A1 | 9/2005 | Winn et al. |
| 2011/0260538 | A1 | 10/2011 | Huang |
| 2011/0278934 | A1 | 11/2011 | Ghosh et al. |
| 2013/0069432 | A1 | 3/2013 | Beg et al. |
| 2013/0193761 | A1 | 8/2013 | Colombi et al. |
| 2014/0049865 | A1* | 2/2014 | Dougal .................. H02H 3/06 361/71 |
| 2014/0097689 | A1 | 4/2014 | Bertuzzi et al. |
| 2014/0258573 | A1 | 9/2014 | Johnson |
| 2014/0375133 | A1* | 12/2014 | McCarthy et al. ..... H02J 9/066 |
| 2015/0263568 | A1* | 9/2015 | Colombi ................ H02J 9/061 307/65 |
| 2016/0020646 | A1* | 1/2016 | Colombi ................ H02J 9/061 307/65 |
| 2016/0036216 | A1* | 2/2016 | Colombi ................ H02J 9/062 361/93.9 |
| 2016/0181864 | A1* | 6/2016 | Reddy .................... G06F 1/28 307/66 |
| 2016/0322809 | A1* | 11/2016 | Wang ..................... H02H 7/222 |
| 2018/0076658 | A1* | 3/2018 | Mannuccini ............ H02M 7/44 |

FOREIGN PATENT DOCUMENTS

| | | |
|---|---|---|
| CN | 100474737 C | 4/2009 |
| EP | 1276202 A2 | 1/2003 |
| JP | 08289485 A | 11/1996 |

OTHER PUBLICATIONS

Herbener, Frank, PILLER Power Systems, "Isolated-Parallel UPS Configuration", White Paper No. 0051-1 / Mrz. 2013, 18 pages.

Vortex Power Systems, "Diesel Rotary UPS System", 5 pages, Fremont, CA.

Chandorkar M C et al., "Novel Architectures and Control for Distributed UPS Systems", Department of Electrical and Computer Engineering, Applied Power Electronics Conference and Exposition, p. 683-689, on Feb. 13, 1994.

Bekiarov et al., "Uninterruptible Power Supplies: Classification, Operation, Dynamics, and Control", Applied Power Electronics Conference and Exposition, 2002. APEC 2002. Seventeenth Annual IEEE, vol. No. 1, pp. 597-604, Conference Location Dallas, TX on 2002.

Frank, "Isolated-Parallel UPS Configuration", Pillar Power System, Piller Group GmbH, Germany, pp. 1-15, on Mar. 25, 2015.

European Search Report issued in connection with corresponding EP Application No. 15190507.2 dated Jan. 4, 2016.

Office Action for CN 201510691327.2, dated Jul. 2, 2019, with translation, 15 pages.

* cited by examiner

PROTECTION METHODS AND SWITCHES IN UNINTERRUPTIBLE POWER SUPPLY SYSTEMS

CROSS-REFERENCE TO RELATED APPLICATIONS

This application is a divisional of U.S. patent application Ser. No. 14/823,233, filed Aug. 11, 2015, and claims the benefit of U.S. Provisional Application No. 62/161,393, filed May 14, 2015, and U.S. Provisional Application No. 62/067,705, filed Oct. 23, 2014. The entire disclosures of each of the foregoing applications are incorporated by reference herein.

TECHNICAL FIELD

The field of the invention relates, generally, to uninterruptible power supplies and, more particularly, to protection methods in uninterruptible power supply systems.

BACKGROUND

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

In at least some known power systems, different power sources, such as separate UPSs, may interfere with one another. If the power sources are not synchronized with one another, they may begin to override one another, causing oscillations or other undesirable effects, and impacting power delivered to one or more loads.

SUMMARY

In one aspect, a system is provided. The system includes a plurality of uninterruptible power supplies (UPSs), a ring bus, a plurality of chokes, each choke of the plurality of chokes electrically coupling an associated UPS of the plurality of UPSs to the ring bus, and at least one switch electrically coupled between at least one UPS of the plurality of UPSs and the ring bus, the at least one switch having an opening time of less than 10 milliseconds.

In another aspect, at least one controller for controlling a power supply system that includes a ring bus, a plurality of uninterruptible power supplies (UPSs), and a plurality of chokes, each choke of the plurality of chokes electrically coupling an associated UPS of the plurality of UPSs to the ring bus is provided. The at least one controller includes a processor, and a memory device communicatively coupled to the processor, the memory device storing executable instructions configured to cause the processor to: detect a fault condition in the power supply system, and switch at least one switch in the power supply system to address the fault condition, wherein the at least one switch is electrically coupled between at least one UPS of the plurality of UPSs and the ring bus, and wherein the at least one switch has an opening time of less than 10 milliseconds.

In yet another aspect, a method of controlling a power supply system that includes a ring bus, a plurality of uninterruptible power supplies (UPSs), and a plurality of chokes, each choke of the plurality of chokes electrically coupling an associated UPS of the plurality of UPSs to the ring bus is provided. The method includes detecting, using at least one controller, a fault condition in the power supply system, and switching, using the at least one controller, at least one switch in the power supply system to address the fault condition, wherein the at least one switch is electrically coupled between at least one UPS of the plurality of UPSs and the ring bus, and wherein the at least one switch has an opening time of less than 10 milliseconds.

DETAILED DESCRIPTION OF THE DRAWINGS

Exemplary embodiments of an uninterruptible power supply system are described here. A plurality of uninterruptible power supplies are arranged in a ring bus configuration and configured to supply power to at least one load. A control device is communicatively coupled to the plurality of uninterruptible power supplies. The plurality of uninterruptible power supplies are each coupled to the ring bus through a respective choke. At least one fast switch (e.g., a switch having an opening time less than 10 milliseconds) is electrically coupled between one uninterruptible power supply of the plurality of uninterruptible power supplies and the ring bus.

Figure 1:
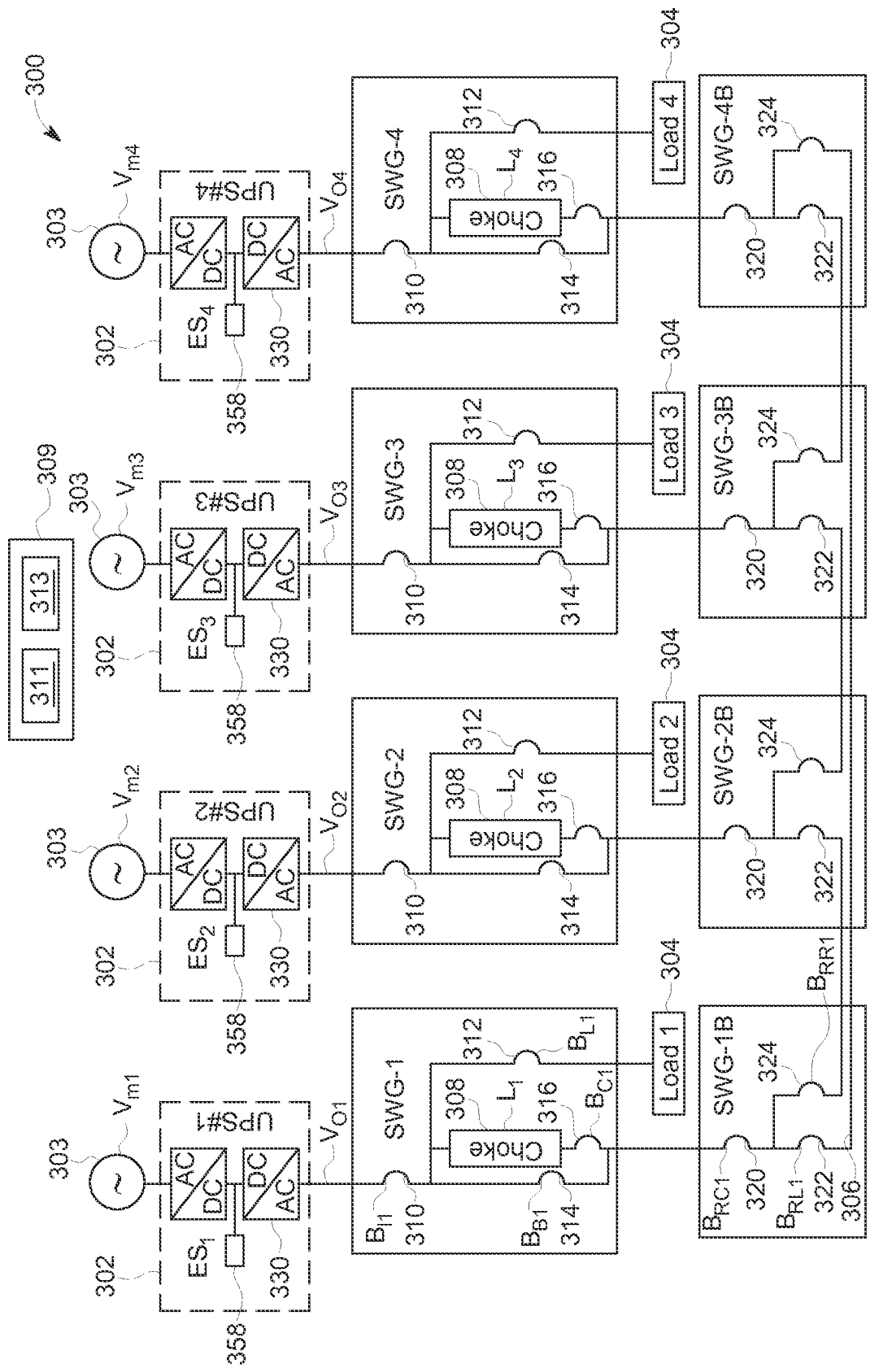
FIG. 1 is a diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage systems 358 (e.g., batteries, flywheels, etc. with their converter) connected to UPSs 302 to keep power flowing to loads 304, as described herein. Further, if a given UPS 302 fails, loads 304 receive power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of switching devices. Specifically, for each UPS 302, a first switching device 310 is electrically coupled between UPS 302 and choke 308, a second switching device 312 is electrically coupled between first switching device 310 and local load 304, a third switching device 314 is electrically coupled between first switching device 310 and ring bus 306, and a fourth switching device 316 is coupled between choke 308 and ring bus 306. Further, at ring bus 306, a central switching device 320, a left switching device 322, and a right switching device 324 are associated with each UPS 302, and facilitate isolating UPS 302 from ring bus 306 and/or other UPSs 302 on ring bus 306. Each switching device 310, 312, 314, 316, 320, 322, and 324 may include associated logic and relays (neither shown) for operation. The protection scheme provided by switching devices 310, 312, 314, 316, 320, 322, and 324 facilitates locating faults in architecture 300 and isolating those faults by opening the appropriate devices. Further, third switching devices 314, also referred to as bypass breakers, facilitate bypassing choke 308 when the associated UPS 302 fails or is under maintenance. This facilitates improving the quality of the voltage on the associated local load 304 as the voltage drop on choke 308 is removed. In the exemplary embodiment, at least one controller 309 detects a fault condition within architecture and controls one or more switching devices 310, 312, 314, 316, 320, 322, and 324 to address the fault condition. As used herein, a 'fault condition' refers to any scenario in which one or more switching devices 310, 312, 314, 316, 320, 322, and 324 should be switched (i.e., opened or closed) to facilitate operation of architecture 300. Accordingly, addressing a 'fault condition' includes bypassing choke 308 when the associated UPS 302 fails or is under maintenance.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Accordingly, to facilitate maximizing a duration of time where the inverter in an associated UPS 302 can sustain a bolted fault on ring bus 306, chokes 308 may be sized to operate the inverter in a linear mode under a short circuit on ring bus 306. The systems and methods described herein allow smaller chokes 308 to be used. As a result, more power may be transferred through chokes 308 under both static and dynamic conditions. Further, as shown in FIG. 1, each UPS 302 includes an inverter 330. Different designs are possible for inverters 330.

Switching devices 310, 312, 314, 316, 320, 322, and 324 may be implemented with one or more types of fast switches. As used herein, a "fast switch" refers to a switching device that is capable of opening and/or closing faster than a typical circuit breaker. For example, upon receiving a switching command (e.g., from controller 309) a fast switch may be capable of opening in less than 10 milliseconds (ms) and capable of closing in less than 2 ms. In some embodiments, for example, a fast switch is capable of opening in approximately 2 to 4 ms after receiving a switching command. Further, solid state switches may be able to close in a fraction of a millisecond.

For example, the fast switches may be fast electromechanical switches and/or electronic/static switches including thyristors, insulated gate bi-polar transistors (IGBTs), or other devices (e.g., linear motor switches with a closing time of approximately 2 ms). The switches may be commanded by relays that implement a specific logic based on various measurements (e.g., differential currents, voltages, etc.). Fast switches have important benefits for protection functions, and also in scenarios when a choke 308 needs to be bypassed as a result of UPS failure. Specifically, the use of faster switches allows for smaller chokes 308 and, accordingly, allows for more power to be transferred through chokes 308. Any combination of switch technology can be used to facilitate protection functions and choke bypass functions. In some embodiments, only bypass switching devices 314 are implemented using fast switches, and the remaining switching devices are implemented using typical circuit breakers. Utilizing different switching technologies facilitates reducing costs, and increasing feasibility and viability of static UPS systems, such as those described herein.

For architecture 300, a fault isolation time, $T_{FI}$, can be represented as the sum of a fault detection time, $T_{FD}$, and an isolating switch opening time, $T_{OS}$. That is, $T_{FI}=T_{FD}+T_{OS}$.

The detection time $T_{FD}$ depends on algorithms implemented in an associated relay, and is typically ½ a cycle. The opening time $T_{OS}$ depends on the switch technology. For a circuit breaker, the opening time $T_{OS}$ may be, for example, 2 cycles. In contrast, for a static switch using thyristors, the opening time $T_{OS}$ may by ⅓ a cycle. Accordingly, when the fault isolation time $T_{FI}$ needs to be relatively low (e.g., less than 20 milliseconds (ms)), replacing circuit breakers with static switches using thyristors significantly improves the fault isolation time $T_{FI}$. If even faster switches are used in place of thyristors (e.g., insulated gate bi-polar transistors (IGBTs)), the opening time may be a fraction of a millisecond. In such embodiments, additional circuitry may be provided in order to circulate the current. Such snubbers are frequently used in electrical systems with an inductive load, where a sudden interruption of current flow leads to a sharp rise in voltage across a current switching device. This additional circuitry is generally unnecessary when thyristors are used, as thyristors generally open only when the current crosses zero.

Figure 2:
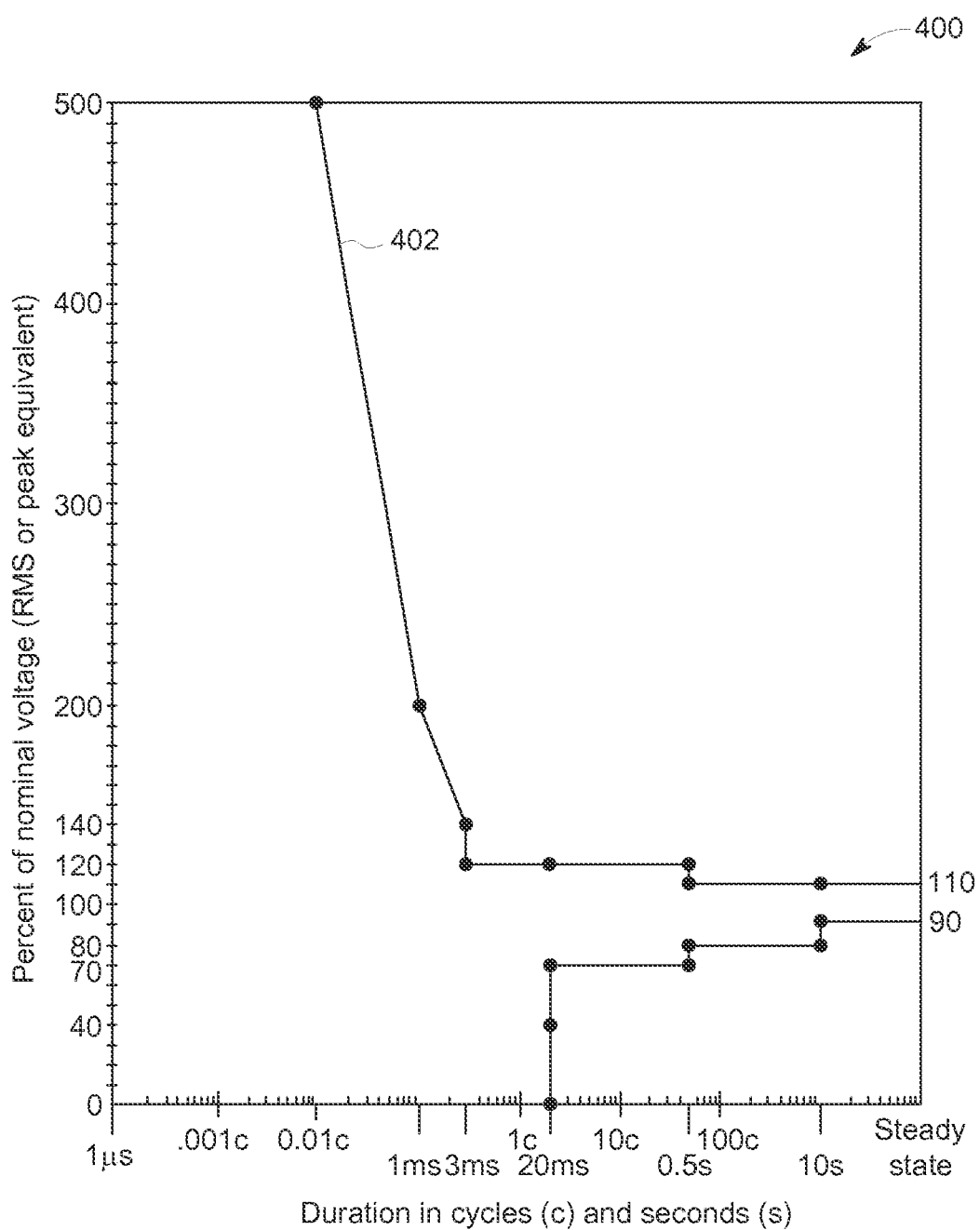
FIG. 2 is a diagram of the Information Technology Industry Council (ITI) Computer Business Equipment Manufacturers Associate (CBEMA) curve.

FIG. 2 is a diagram 400 illustrating the Information Technology Industry Council (ITI) Computer Business Equipment Manufacturers Associate (CBEMA) curve 402. Curve 402 shows the acceptable voltage input for an information technology (IT) server. As demonstrated by curve 402, a complete loss of voltage can be accepted for up to 20 ms. Other power quality standards tolerate a complete loss of voltage for up to 10 ms. This is relevant for ring bus systems using static UPSs, as these generally have a much smaller fault current than rotary UPSs, resulting in larger values of ring bus chokes, such as chokes 308. This is due to the fact that chokes 308 are typically sized to sustain a bolted fault on ring bus 306 for enough time to guarantee isolation of the fault through activation of specific breakers/switches. Further, additional time must be considered for situations where a breaker/switch fails to open, requiring an alternative fault isolation strategy. Accordingly, using fast switches makes it possible to use smaller values for chokes 308.

In another embodiment, only switching devices 316 are implemented using fast switches (i.e., where the rest of switching devices 310, 312, 314, 320, 322, and 324 are implemented using typical circuit breakers) with the goal of isolating each UPS 302 from ring bus 306 relatively quickly when a fault occurs on ring bus 306. Still other embodiments use typical circuit breakers for switching devices 316, but add a fast switch in series with switching devices 316 for quick disconnection functionality. As described above, snubbers may be utilized to manage a sudden interruption of current. When UPSs 302 are quickly isolated from ring bus 306 in the event of a fault on ring bus 306, it is possible to significantly reduce the inductance value of chokes 308, as chokes 308 no longer need to function to completely isolate an associated UPS 302 from ring bus 306. In other words, a voltage at an output of a given UPS 302 may drop to a low value (zero at the limit) for a limited time (e.g., 20 ms following the ITIC-CBEMA curve or 10 ms following other standards). Accordingly, it is important to re-establish the voltage as soon as disconnection from the fault is achieved.

In embodiments where thyristors are used in lieu of circuit breakers or in series with circuit breakers for quick disconnection functionality, specific techniques may be used to accelerate the disconnection. For example, when thyristors are commanded to switch off, they actually open only when the current they are carrying crosses zero. Accordingly, it is possible to force such thyristors open relatively quickly by forcing specific patterns on UPS output voltages. In particular, as soon as a fault on ring bus 306 is detected (e.g., using voltage sensors on ring bus 306 itself), the thyristors can be commanded to open and the voltage on the UPS output can be commanded to force the currents through the thyristors to invert (i.e., change sign).

As described above, bypass switching devices 314 are used to bypass an associated choke 308 when a given UPS 302 has failed or is under maintenance. As an example, if a first UPS fails, the local load 304 associated with that UPS will be fed by the remaining UPSs through their chokes 308, the ring bus 306, and the choke 308 of the failed UPS. Once bypass switching device 314 is closed, the local load 304 will be fed directly by ring bus 306. Accordingly, the closing time of bypass switching device 314 is important.

When bypass switching device 314 is a typical circuit breaker, the closing time may be around 50 ms, and therefore the voltage drop on choke 308 of the failed UPS 302 needs to be taken into account and will affect the quality of the voltage of local load 304. In contrast, if bypass switching device 314 is a static switch including thyristors, the closing time is substantially instantaneous (e.g., a fraction of a millisecond) and the voltage drop across choke 308 is not an issue.

Figure 3:
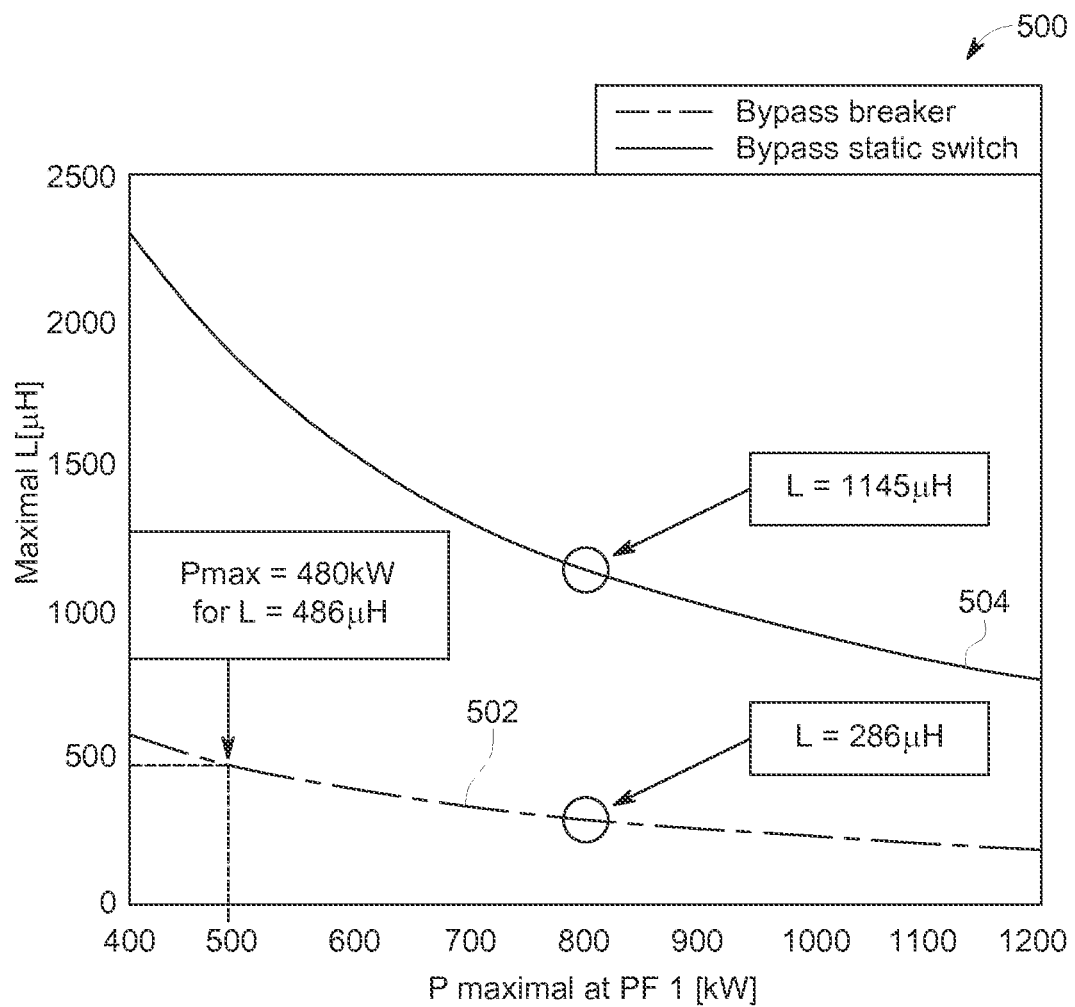
FIG. 3 is a graph comparing operation of a bypass breaker and a bypass static switch.

This is demonstrated in a graph 500 of FIG. 3 where a maximal value of choke 308 is represented as a function of the power to be transferred. If bypass switching device 314 is a breaker, the voltage drop on choke 308 has to be taken into account due to the closing time of the breaker, and for a given value of choke 308, it is possible to transfer substantially less power. On the other hand, and as an example, if a given UPS 302 fails and as a consequence, a maximum power of 800 kW needs to be transferred from ring bus 306 to local load 304 of UPS 302, the maximal value of choke 308 that can be used depends on the type of switch used to bypass choke 308. If a breaker is used, as shown by a first curve 502, the maximal value of choke 308 is 286 µH, while if a static switch is used, as shown by a second curve 504, the maximal value of choke 308 increases to 1145 µH. In conclusion, the use of a static switch to bypass choke 308 provides more freedom to select the value of choke 308 as it significantly increases a range of possible value for choke 308. In some cases, this is determinant for finding a solution to choke design problems, as the minimal value of choke 308 is typically determined by a requirement to maintain an acceptable voltage on critical loads when a fault occurs on ring bus 306. Although bypass switching device 314 has been discussed in detail, any switching device 310, 312, 314, 316, 320, 322, and 324 in architecture 300 may be implemented with a fast switch instead of a circuit breaker. In conclusion, the use of a static switch (or other fast switch) to bypass choke 308 allows more degrees of freedom in the selection of chokes 308.

In embodiments where switching devices 316 are implemented using fast switching devices (e.g., to enable isolating each UPS 302 from ring bus 306 relatively quickly when a fault occurs on ring bus 306), additional features may be implemented, as described herein. For example, switching device 316 may be coupled in parallel with a resistor or reactance (e.g., an inductor) to facilitate circulation of a relatively small fault current when switching device 316 is open. Further, switching device 316 may be implemented using a thyristor, and a forced commutation technique may be used to open the thyristor quickly. Moreover, a sensorless current estimation algorithm may be used to facilitate performing the forced commutation technique. Each of these features is discussed in more detail below.

Figure 4:
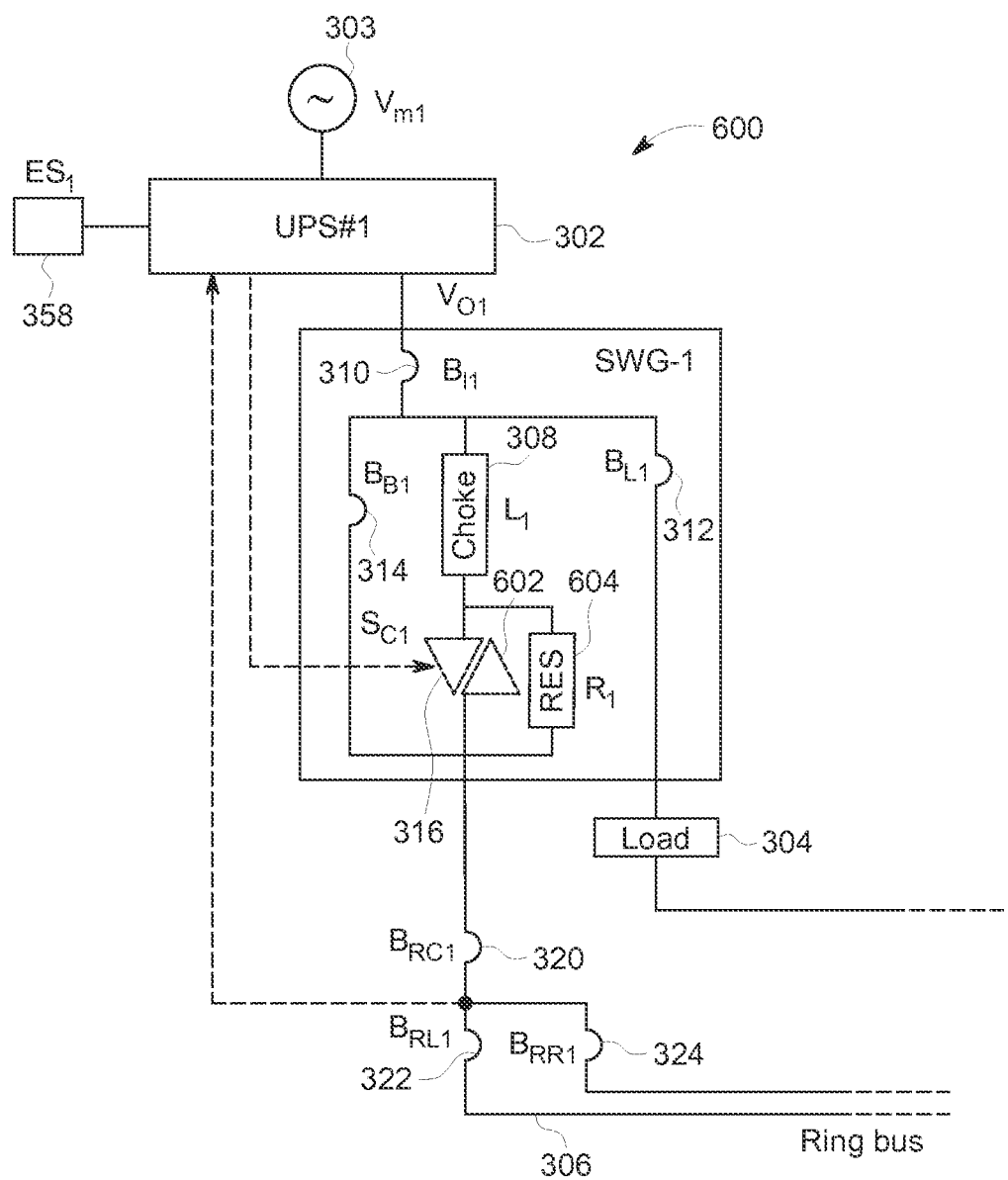
FIG. 4 is a diagram of a portion of a ring bus architecture that may be used with the ring bus architecture shown in FIG. 1.

FIG. 4 is a diagram of a portion 600 of a ring bus architecture, such as architecture 300 (shown in FIG. 1). Like reference numerals indicate like parts. In the embodiment of FIG. 4, switching device 316 is implemented using a fast switching device 602 instead of a circuit breaker. As discussed above, fast switching device 602 is coupled in parallel with a reactance (e.g., an inductor) or a resistor 604. Alternatively, switching device 316 may be implemented using a fast switching device coupled in series with a circuit breaker. Implementing switching device 316 with a fast switching device 602 instead of a breaker facilitates reducing the size of choke 308 and changing a fault management strategy in order to disconnect UPS 302 from ring bus 306 in the event of a fault on ring bus 306. As described above, chokes 308 are typically sized to sustain a bolted fault on ring bus 306 for enough time to guarantee isolation of the fault through activation of specific switches (e.g., switching device 316). Further, additional time should be taken into account for situations where a switch fails to open, requiring an alternative fault isolation strategy.

When choke size is considerably reduced (e.g., 20-30% per unit (pu)), it may be impossible to sustain a bolted fault on ring bus 306, and the voltage may fall outside ITI-CBEMA curve 402 (shown in FIG. 2) or other, more stringent standards. To restore an acceptable voltage on the critical loads, each UPS 302 must be disconnected from ring bus 306 as quickly as possible in the event of a fault on ring bus 306. This is one reason why implementing switching device 316 using a fast switch is advantageous.

However, there are two competing concerns. On the one hand, as discussed above, in the event of a fault on ring bus 306, it is desirable to disconnect each UPS 302 as soon as possible. However, if the disconnection is too quick, protective relays may not have sufficient time to locate the fault and command the appropriate switching devices (e.g., circuit breakers) to open in order to isolate the fault.

Figure 5:
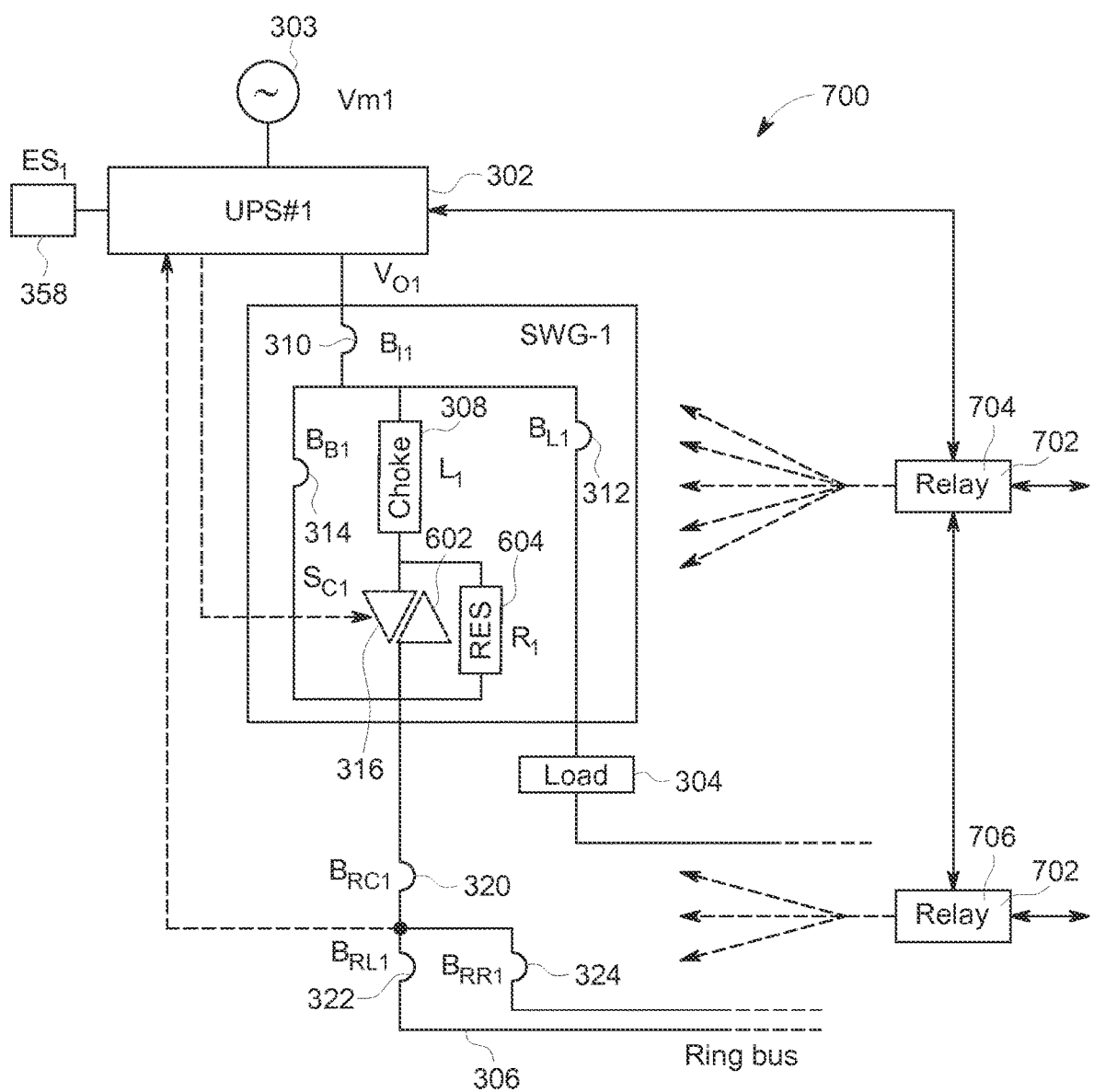
FIG. 5 is a diagram of a portion of a ring bus architecture that may be used with the ring bus architecture shown in FIG. 1.

FIG. 5 is a diagram of a portion 700 of a ring bus architecture, such as architecture 300 (shown in FIG. 1). Like reference numerals indicate like parts. Portion 700 includes two protective relays 702, and switching device 316 is implemented using a fast switching device 602 coupled in parallel with a reactance or resistor, $R_1$ 604. In this embodiment, a protection scheme is implemented using a set of intelligent devices (e.g., UPSs 302 and protective relays 702), and each UPS 302 communicates with two protective relays 702: a first protective relay 704 that controls a protection zone including choke 308, and a second protective relay 706 that controls a zone including ring bus 306.

Any suitable type of communication may be implemented between UPS 302 and protective relays 702, and between relays 702 themselves. In some embodiments, the communication between UPS 302 and protective relays 702 may be relatively slow and limited. For example, UPS 302 may be able to detect ring bus faults based on a measurement of ring bus phase voltages relatively quickly (e.g., within approximately 0.5 microseconds (us)). However, protective relays 702 may detect ring bus faults based on differential protections relatively slowly (e.g., within approximately 6 µs). Therefore, in some situations, the disconnection commanded by UPS 302 occurs relatively quickly, and protective relays 702 do not have sufficient time to locate the fault and command the appropriate switching devices to open in order to isolate the fault.

To address this, as shown in FIG. 5, reactance or resistor 604 is coupled in parallel with fast switching device 602. Accordingly, even when fast switching device 602 is open, a relatively small fault current circulates through reactance or resistor 604. This allows protective relays 702 to complete fault detection and command the appropriate switching devices to open.

In the embodiments of FIGS. 4 and 5, any suitable fast switching device may be used to implement switching device 316. In one example, fast switching device 602 is a thyristor switch (i.e., a silicon-controlled rectifier), which is relatively inexpensive and robust. The thyristor switch is a bidirectional switch that includes two thyristors arranged in an anti-parallel configuration. Notably, thyristors cannot be switched off (i.e., opened) instantaneously, but only switch off when the current they conduct crosses zero.

Accordingly, in embodiments using a thyristor switch as switching device 316, a forced commutation technique is used to turn off whichever thyristor is conducting current. Specifically, as soon as a fault is detected on ring bus 306, a command is issued (e.g., from controller 309) to open the appropriate thyristor. At the same time, inverter voltages of UPS 302 are modified in order to reverse bias the thyristor. This forces the currents in the thyristor to reverse (e.g., reduce in absolute value and change polarity), which causes the thyristor to open. For three-phase systems, this is performed for every phase (i.e., each phase includes a thyristor switch with two anti-parallel thyristors, one of which is forced open).

In order to properly modify the inverter voltages, the polarity of the choke current (i.e., the current through choke 308) must be determined at the time the fault is detected. For example, considering a phase to ground fault on the ring bus, if the choke current is positive for the faulted phase and the ring bus voltage is known, the UPS voltage for that phase needs to be modified to force the choke current from positive to negative to force a zero crossing.

The choke current may be measured by dedicated sensors, but this may be relatively expensive, and it may also be difficult to accurately measure the amplitude of the current. For example, in normal conditions when UPS loads 304 are balanced, the choke current is relatively close to zero. However, during fault conditions, the choke current becomes relatively large. Accordingly, it may be challenging to find current sensors with sufficient resolution and measurement range.

Figure 6:
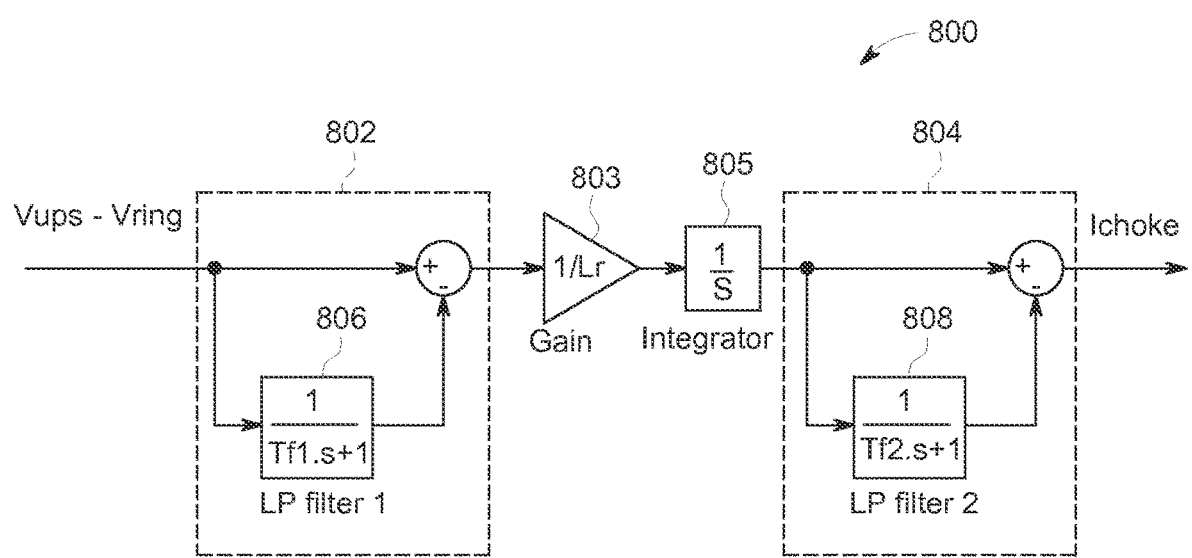
FIG. 6 is a logic diagram of an exemplary sensorless current estimation algorithm.

To address the issues of dedicated sensors, a sensorless choke current estimation algorithm may be used. FIG. 6 is a logic diagram 800 of the algorithm. The algorithm determines the choke current by performing an open loop integration of the voltage across the choke 308, determined for every phase by the difference between the UPS voltage and the ring bus voltage. This measurement alone may be relatively sensitive to the (unknown) initial current and any offset in the measured UPS or ring bus voltages. To solve these issues, as shown in FIG. 6, a first high pass filter 802 is used at the input of the integration and a second high pass filter 804 is used at the output of the integration. The integration is accomplished by a gain amplifier 803 and an integrator 805. These high pass filters 802 and 804 may be realized using low pass filters 806 and 808 with time constants of Tf1 typically equal to 0.1 s and Tf2 typically equal to 0.2 s, respectively. The algorithm may be implemented, for example, using controller 309.

Figure 7A:
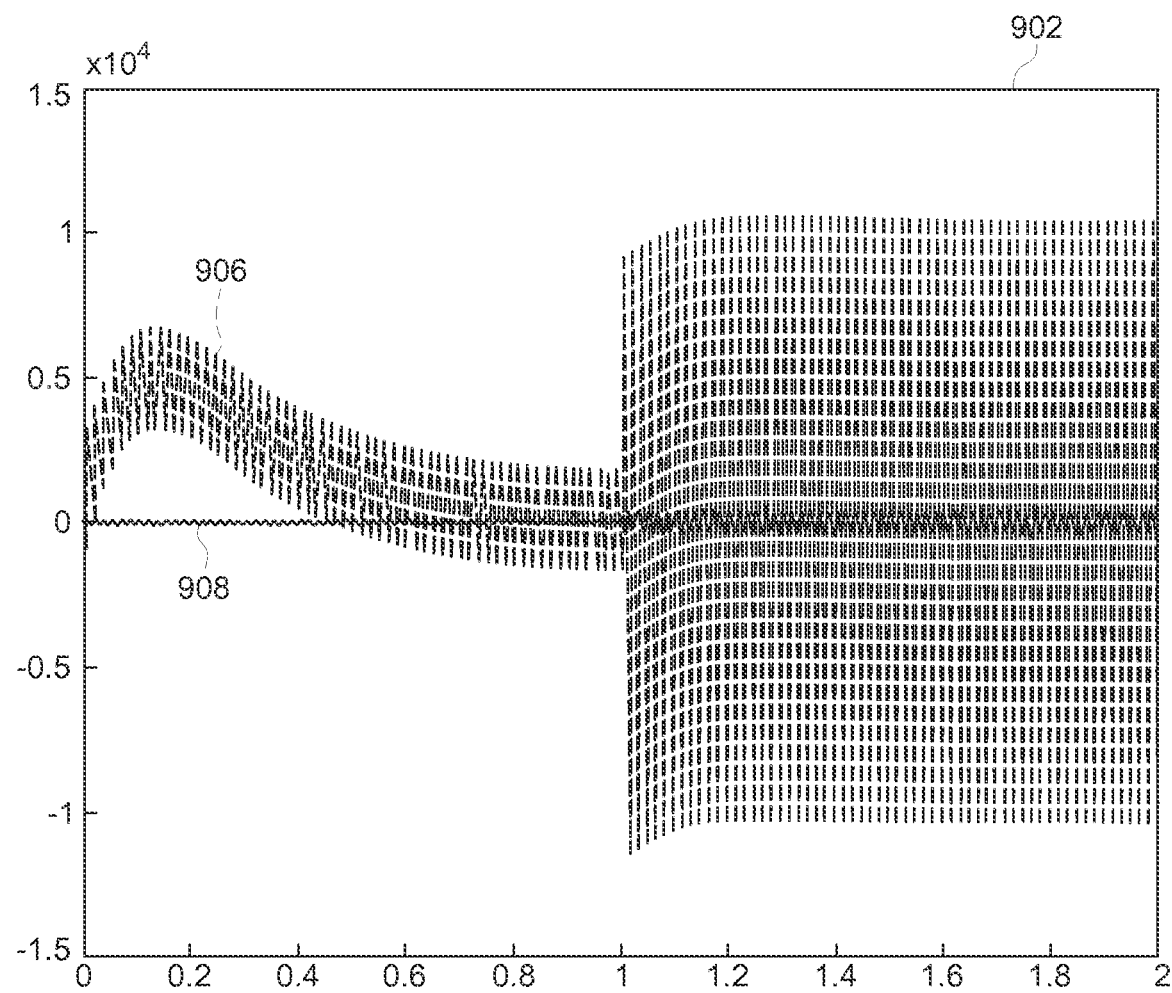
FIGS. 7A and 7B are graphs demonstrating results of the sensorless current estimation algorithm shown in FIG. 6.
Figure 7B:
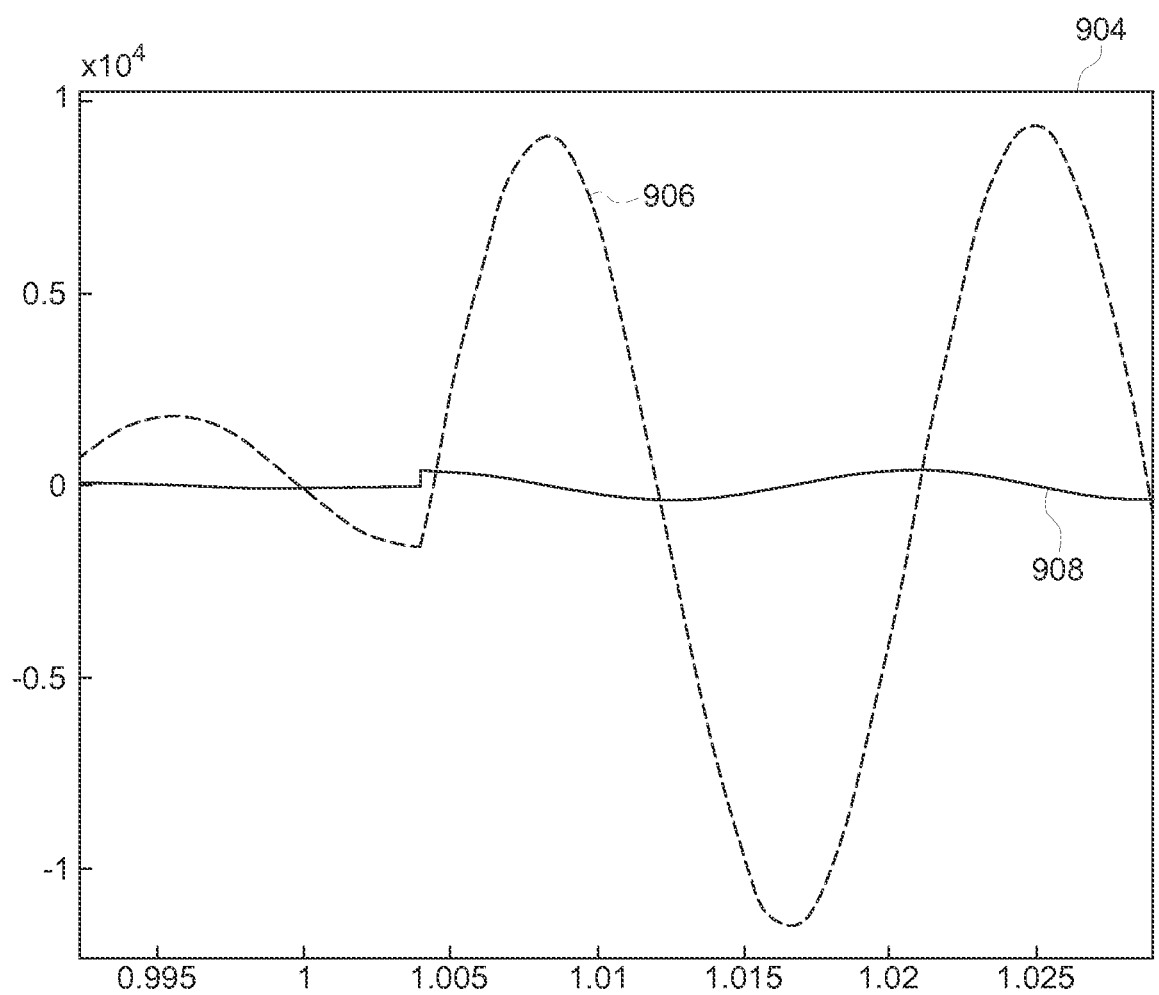

FIGS. 7A and 7B show results of the sensorless choke current estimation algorithm. FIG. 7B is a magnified portion 904 of the plot 902 of FIG. 7A, and plot 902 and portion 904 include a current trace 906 and a voltage trace 908. In FIGS. 7A and 7B, the algorithm is started at time t=0 s, and the system has an offset error of 10 volts (V). FIG. 7A demonstrates how the estimation error on the choke current is removed by the high pass filters. At time t=1.004 s, a fault on ring bus 306 is simulated, and the high fault current is correctly estimated for several cycles using the sensorless choke current estimation algorithm. Depending on the phase angle of the fault, a DC current component may appear. This DC current component would be slowly removed by the high pass filters, creating an estimation error. However, this estimation error is not problematic, as the goal of the algorithm is to obtain the choke current value at the time of the fault, in order to properly polarize choke 308 by applying the appropriate UPS voltage.

Notably, the systems and methods described herein are applicable independent of voltage level, and more particularly, are applicable to both low voltage (LV) (e.g., 480 V phase-phase) and medium voltage (MV) (e.g., 13.8 kV phase-phase) applications.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) detecting a fault condition in a ring bus system; and (b) switching at least one switch in the ring bus system to address the fault condition, wherein the at least one switch is electrically coupled between one UPS of a plurality of UPSs and a ring bus, and wherein the at least one switch has an opening time of less than 10 milliseconds.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a plurality of uninterruptible power supplies (UPSs);
a ring bus;
a plurality of chokes, each choke of said plurality of chokes electrically coupling an associated UPS of said plurality of UPSs to said ring bus;
at least one switch electrically coupled between at least one UPS of said plurality of UPSs and said ring bus; and
at least one controller configured to control the at least one switch in response to detecting a fault condition in the system, wherein to control the at least one switch comprises to switch the at least one switch in less than 10 milliseconds in response to detecting the fault condition, and to control a frequency of an output voltage of each UPS of the plurality of UPSs by performing an open loop integration of the output voltage across one choke of the plurality of chokes and performing high pass filtering before and after the open loop integration.

2. The system of claim 1, wherein said at least one switch comprises a switch configured to selectively bypass at least one choke of said plurality of chokes.

3. The system of claim 1, wherein said at least one switch comprises a switch electrically coupled between one choke of said plurality of chokes and said ring bus.

4. The system of claim 1, wherein said plurality of UPSs comprises a plurality of static double-conversion UPSs.

5. The system of claim 1, further comprising a reactance or a resistor electrically coupled in parallel with said at least one switch.

6. The system of claim 1, wherein to control the frequency of said output voltage comprises to (i) detect a fault on said ring bus and (ii) modify said output voltage of one of said plurality of UPSs to invert a polarity of a current.

7. A system comprising:
a plurality of uninterruptible power supplies (UPSs);
a ring bus;
a plurality of chokes, each choke of said plurality of chokes electrically coupling an associated UPS of said plurality of UPSs to said ring bus;
at least one switch electrically coupled between one choke of said plurality of chokes and said ring bus;
a reactance or a resistor electrically coupled in parallel with said at least one switch; and
at least one controller configured to control the at least one switch in response to detecting a fault condition in the system, wherein to control the at least one switch comprises to switch the at least one switch in less than 10 milliseconds in response to detecting the fault condition, and to control a frequency of an output voltage of each UPS of the plurality of UPSs by performing an open loop integration of the output voltage across one choke of the plurality of chokes and performing high pass filtering before and after the open loop integration.

8. At least one controller comprising;
a processor; and
a memory device communicatively coupled to said processor, said memory device storing executable instructions configured to cause said processor to:
detect a fault condition in a power supply system that comprises a plurality of uninterruptible power supplies (UPSs), a ring bus, at least one switch electrically coupled between at least one UPS of the plurality of UPSs and the ring bus, and a plurality of chokes each electrically coupling an associated UPS of the plurality of UPSs to the ring bus;
switch the at least one switch to address the fault condition in less than 10 milliseconds in response to detecting the fault condition; and
control a frequency of an output voltage of one UPS of the plurality of UPSs by performing an open loop integration of the output voltage across one choke of the plurality of chokes and performing high pass filtering before and after the open loop integration.

9. The at least one controller of claim 8, wherein to switch the at least one switch comprises to switch a switch configured to selectively bypass at least one choke of the plurality of chokes.

10. The at least one controller of claim 8, wherein to switch the at least one switch comprises to switch a switch electrically coupled between one choke of the plurality of chokes and the ring bus.

11. A method comprising:
detecting, using at least one controller, a fault condition in a power supply system that comprises a plurality of uninterruptible power supplies (UPSs), a ring bus, at least one switch electrically coupled between at least one UPS of the plurality of UPSs and the ring bus, and a plurality of chokes each electrically coupling an associated UPS of the plurality of UPSs to the ring bus;
switching, in response to the at least one controller detecting the fault condition, the at least one switch in less than 10 milliseconds; and
controlling a frequency of an output voltage of one UPS of the plurality of UPSs by performing an open loop integration of the output voltage across one choke of the plurality of chokes and performing high pass filtering before and after the open loop integration.

12. The method of claim 11, wherein switching the at least one switch comprises switching a switch to selectively bypass at least one choke of the plurality of chokes.

13. The method of claim 11, wherein switching the at least one switch comprises switching a switch electrically coupled between one choke of the plurality of chokes and the ring bus.

* * * * *